United States Patent [19]
Haberstroh

[11] Patent Number: 6,108,193
[45] Date of Patent: Aug. 22, 2000

[54] FIREWALL ASSEMBLY FOR A MOTOR VEHICLE

[75] Inventor: Rudolf Haberstroh, Schonach, Germany

[73] Assignee: DaimlerChrysler AG, Germany

[21] Appl. No.: 09/173,721

[22] Filed: Oct. 16, 1998

[30] Foreign Application Priority Data

Oct. 16, 1997 [DE] Germany ............................ 197 45 760

[51] Int. Cl.⁷ .............................. H02B 1/00; B60K 37/00
[52] U.S. Cl. ........................... 361/600; 296/189; 296/194
[58] Field of Search ......................... 174/48, 50; 180/90;
200/296; 248/27.1; 307/10.1, 147, 148;
361/600, 627, 641, 647, 679; 296/701,
189, 741, 194

[56] References Cited

U.S. PATENT DOCUMENTS 5,856,908  1/1999  Takiguchi et al. ...................... 361/627
5,924,764  7/1999  Eipper et al. ........................... 296/194

FOREIGN PATENT DOCUMENTS 41 16 832   11/1992  Germany.
43 41 355    6/1994  Germany.
195 24 165   8/1996  Germany.

Primary Examiner—Gregory Thompson
Attorney, Agent, or Firm—Evenson, McKeown, Edwards & Lenahan, P.L.L.C.

[57] ABSTRACT

A firewall assembly for a motor vehicle has a firewall defining a plurality of mounting spaces. At least one module containing electronic control devices is mountable to the firewall. At least one functional assembly is mountable in either of a first of the mounting spaces located on a left-hand drive side of a center plane of the firewall or a second of the mounting spaces located on a right-hand drive side of the center plane of the firewall. At least one module containing electronic control devices is mounted in the firewall such that an outside contour thereof is located laterally outside of the first and second mounting spaces.

7 Claims, 3 Drawing Sheets

FIREWALL ASSEMBLY FOR A MOTOR VEHICLE

BACKGROUND AND SUMMARY OF THE INVENTION

This application claims the priority of German patent 197 45 760.6, filed Oct. 16, 1997, the disclosure of which is expressly incorporated by reference herein.

The invention relates to a firewall assembly for a motor vehicle, especially for an automobile, with at least one module of electronic control devices and with at least one functional assembly that can be mounted on the middle of the firewall, as viewed in the lengthwise direction of the vehicle, in a left-hand-drive or right-hand-drive design.

A firewall of this kind is known from German patent document DE 195 24 165 A1. On either side of the middle of the firewall, the known firewall has a passage with the same shape, with corresponding functional assemblies being mountable in the passages optionally on the left or on the right. Provision can be made for a steering gearshaft to pass through in a functional assembly module. The passage can also be closed by a module containing electronic control devices. Depending on whether the vehicle is designed for right-hand or left-hand drive, therefore, the appropriate modules can be positioned in the symmetrically constructed firewall. However, electronic control devices in particular in the known firewall must be located accordingly on the left side or the right side depending on whether it is a left-hand or a right-hand drive vehicle.

A goal of the invention is to provide a firewall of the type described generally above that allows the electronic control devices to be mounted regardless of whether the firewall is designed for a right-hand or left-hand drive vehicle.

This and other goals have been achieved according to the present invention by providing a firewall assembly for a motor vehicle, comprising: a firewall defining a plurality of mounting spaces; at least one module containing electronic control devices mounted to said firewall; and at least one functional assembly mounted in either of a first of said mounting spaces located on a left-hand drive side of a center plane of said firewall or a second of said mounting spaces located on a right-hand drive side of the center plane of said firewall, wherein the at least one module containing electronic control devices is mounted in said firewall such that an outside contour thereof is located laterally outside of said first and second mounting spaces.

This and other goals have been achieved according to the present invention by providing a firewall assembly for a motor vehicle, comprising: a firewall defining a plurality of mounting spaces including a first functional assembly mounting space located on a left-hand drive side of a center plane of the firewall, a second functional assembly mounting space located on a right-hand drive side of the center plane of the firewall, and an electronic control unit mounting space located laterally outside of said first and second mounting spaces; at least one module containing electronic control devices mountable in said electronic control unit mounting space; and at least one functional assembly mountable in either of said first or second functional assembly mounting spaces.

This and other goals have been achieved according to the present invention by providing a firewall for a motor vehicle, said firewall defining a plurality of mounting spaces including: a first functional assembly mounting space located on a left-hand drive side of a center plane of the firewall; a second functional assembly mounting space located on a right-hand drive side of the center plane of the firewall; and an electronic control unit mounting space located laterally outside of said first and second mounting spaces.

This and other goals have been achieved according to the present invention by providing a method of assembling a firewall for a motor vehicle, comprising: providing a firewall defining a plurality of mounting spaces including a first functional assembly mounting space located on a left-hand drive side of a center plane of the firewall, a second functional assembly mounting space located on a right-hand drive side of the center plane of the firewall, and an electronic control unit mounting space located laterally outside of said first and second mounting spaces; mounting at least one module containing electronic control devices in said electronic control unit mounting space; and mounting at least one functional assembly in either of said first or second functional assembly mounting spaces.

According to the invention, a mounting space is provided for the at least one functional assembly on the firewall, on both the right side and on the left side, defined in its firewall position in the transverse direction of the vehicle, and in that the at least one module containing electronic control devices is positioned at a distance from the respective mounting space with its outside contour, as viewed in the transverse direction of the vehicle. This ensures that the mounting of the electronic control devices, preferably in an appropriate modular box, does not interfere with the different positioning of the at least one functional assembly in a right-hand or left-hand drive vehicle, so that the module containing electronic control devices and defined by the control device box can be mounted on the firewall before the firewall has been specifically arranged for right-hand or left-hand drive. A preferred distance is 10 mm. Then only a single module or two modules, depending on the number of control devices to be installed, can be provided for the control devices, said modules then being preferably positioned on opposite sides of the firewall, likewise under the conditions described. In particular, air-conditioning systems and brake systems can be provided as functional assemblies that are differently positionable for left-hand or right-hand drive.

In designing the invention, the at least one module, as viewed from the middle of the firewall in the transverse direction of the vehicle, is positioned outside the at least one mounting space. There is then sufficient room available for mounting the control devices laterally on either side externally on the firewall.

According to certain preferred embodiment of the invention, the mounting space for the functional assembly has the same distance in the transverse direction of the vehicle from the middle of the firewall on both the right and left sides. This results in an especially good utilization of space.

According to certain preferred embodiments of the invention, with two modules containing electronic control devices mounted on opposite sides of the firewall, the modules are each located at the same distance from the respective right-hand or left-hand mounting spaces relative to the middle of the firewall. This design also results in an especially good utilization of space when there are two control unit boxes.

Other objects, advantages and novel features of the present invention will become apparent from the following detailed description of the invention when considered in conjunction with the accompanying drawings.

DETAILED DESCRIPTION OF THE DRAWINGS

Figure 1:
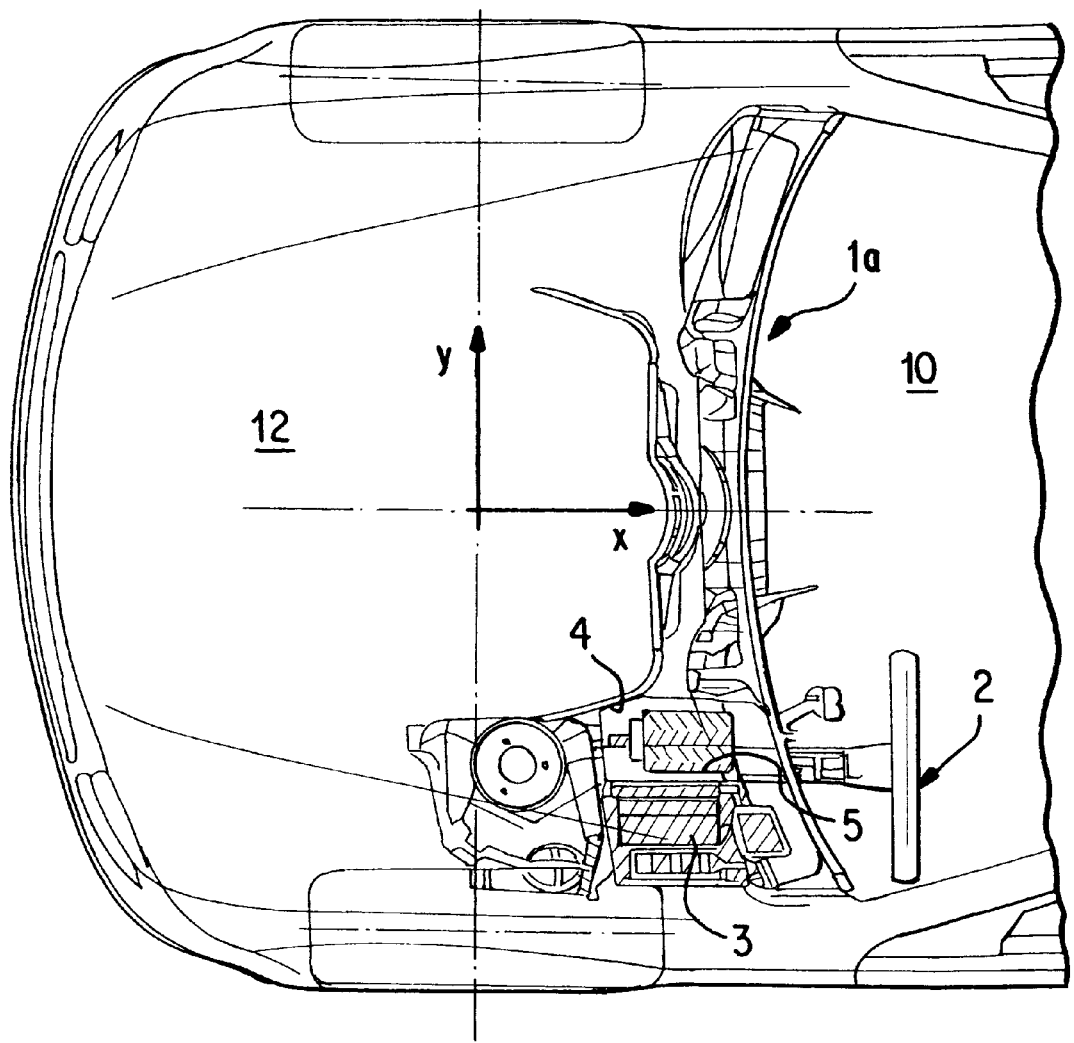
FIG. 1 is a schematic top view of the front portion of an automobile including a firewall according to a preferred embodiment of the present invention.

An automobile according to FIG. 1, has a vehicle interior 10 as well as a front end compartment 12 in which an engine is preferably accommodated, as known in the art. The engine compartment 12 formed by the front end is separated from the vehicle interior by a firewall 1a which closes off the passenger compartment 10 from the front end and extends across the width of the passenger compartment 10. A center of firewall 1a is defined by a vertical vehicle center line plane which runs in the lengthwise direction X of the vehicle. As viewed in the travel direction of the automobile, the firewall has on the left-hand side a driving function unit 2 that is composed of the steering system as well as a pedal arrangement that includes a brake pedal and an accelerator. This location of driving function unit 2 on the left side of firewall 1a defines a left-hand drive design for firewall 1a.

On the front of firewall 1a that faces the engine compartment 12, a control unit box 3 is positioned externally on the left side, said box containing various electrical or electronic control devices. The outside contour of this module, which is defined by the control unit box as well as the control devices accommodated inside the control device box, for electrical or electronic control devices, is indicated by the shading in FIG. 1. Control device box is located in a specific coordinate position in vehicle transverse direction Y and hence at a specific distance from the middle of the firewall. This distance is defined by the fact that the minimum distance of control unit box 3 from the middle of the firewall in the transverse direction Y of the vehicle and hence the smallest Y dimension is larger in every case than the distance of the outer edge of a braking device 5 and hence its installation dimensions with respect to the middle of the firewall. This braking device 5, depending on whether the vehicle is a left-hand or right-hand drive model, is mounted either to the left or right of the middle of the firewall. The innermost Y dimension of control unit box 3, with the contour of any mount for control unit box 3 already having been taken into account, in any case has an at least small distance from braking device 5 or from its mounting space position. Preferably this distance is at least 10 mm.

Likewise specified in its coordinates in vehicle transverse direction Y is the mounting space for an air-conditioning system 4, especially an air intake/water drain that must be accommodated in right-hand drive and left-hand drive vehicles but on different sides. The respective mounting space for air-conditioning system 4 for a right-hand drive or a left-hand drive vehicle can be provided inside the mounting space for braking device 5 and/or vice versa. The position of control unit box 3 is located at a distance from the mounting space of air-conditioning system 4 such that the arrangement of air-conditioning system 4 shown for a right-hand drive vehicle in FIG. 1 does not necessitate any change in position of control device box 3. Control device box 3 can thus always remain on the left-hand side regardless of the design of firewall 1a for right-hand drive or left-hand drive.

Figure 2:
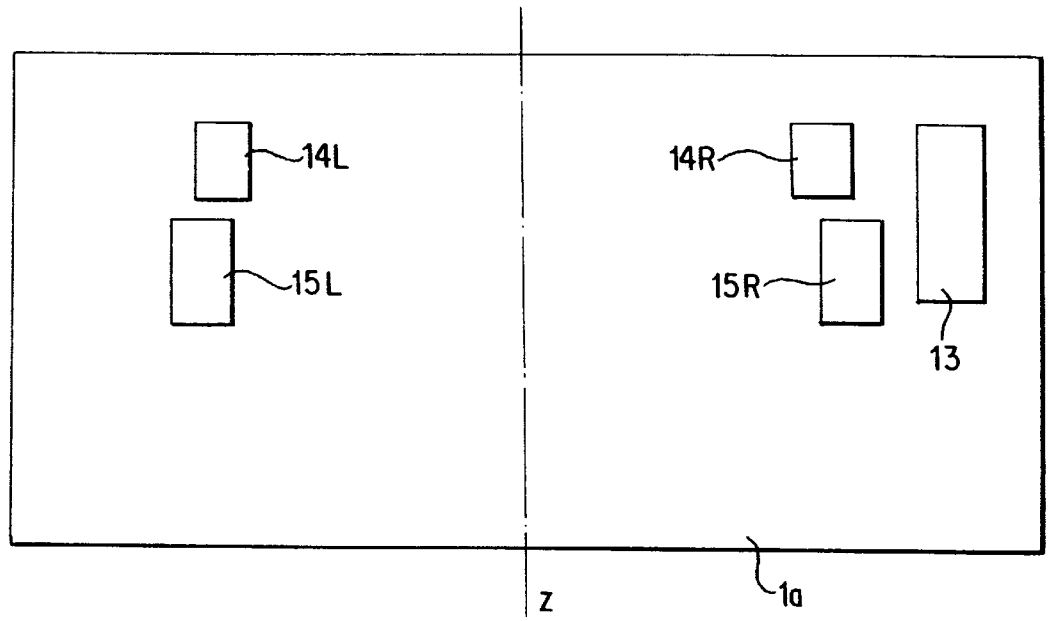
FIG. 2 is a schematic front view of the firewall of FIG. 1.

As shown in FIG. 2, which is a view of the firewall 1a of FIG. 1 taken from the engine compartment 12 facing rearwardly, the firewall 1a includes a plurality of mounting spaces. A control unit mounting space 13 is provided for the control unit box 3. Air-conditioning system mounting spaces 14L, 14R are provided on left and right sides of a vertical vehicle center line z, respectively. Braking device mounting spaces 15L, 15R are provided on left and right sides of the vertical vehicle center line z, respectively.

Figure 5:
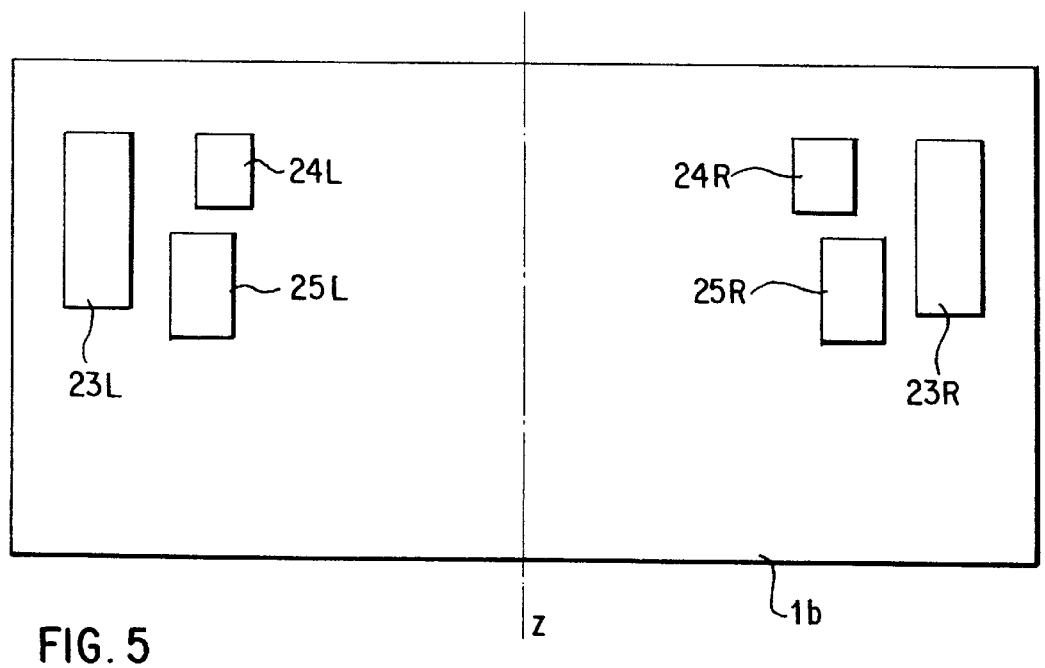
FIG. 5 is a schematic front view of the firewall of FIGS. 3–4.
Figure 3:
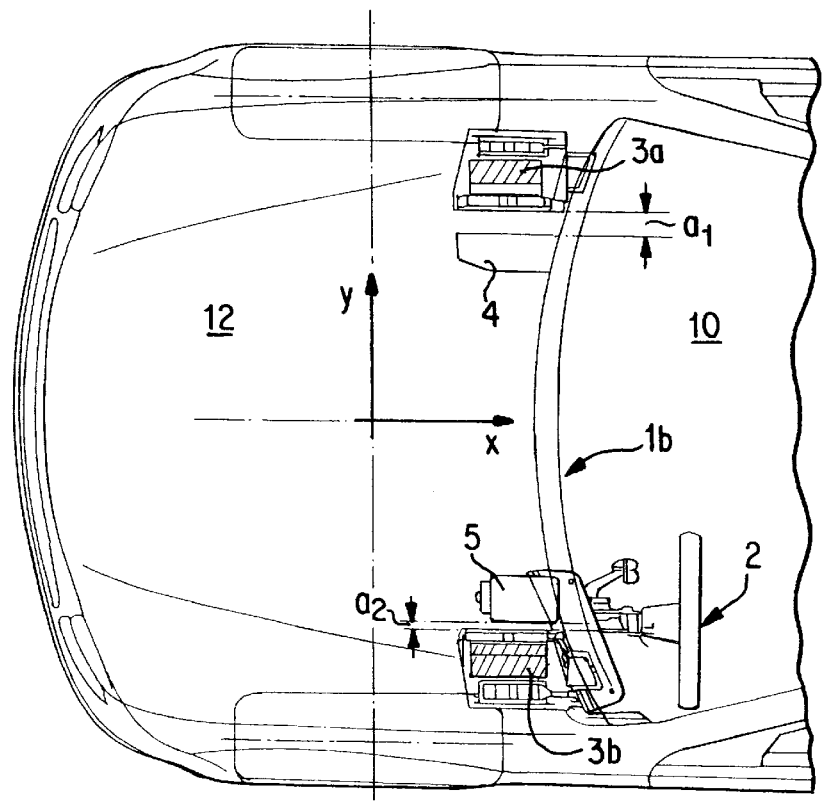
FIG. 3 is a schematic top view of the front portion of an automobile including a firewall according to another preferred embodiment of the present invention, set up for left-hand drive operation.
Figure 4:
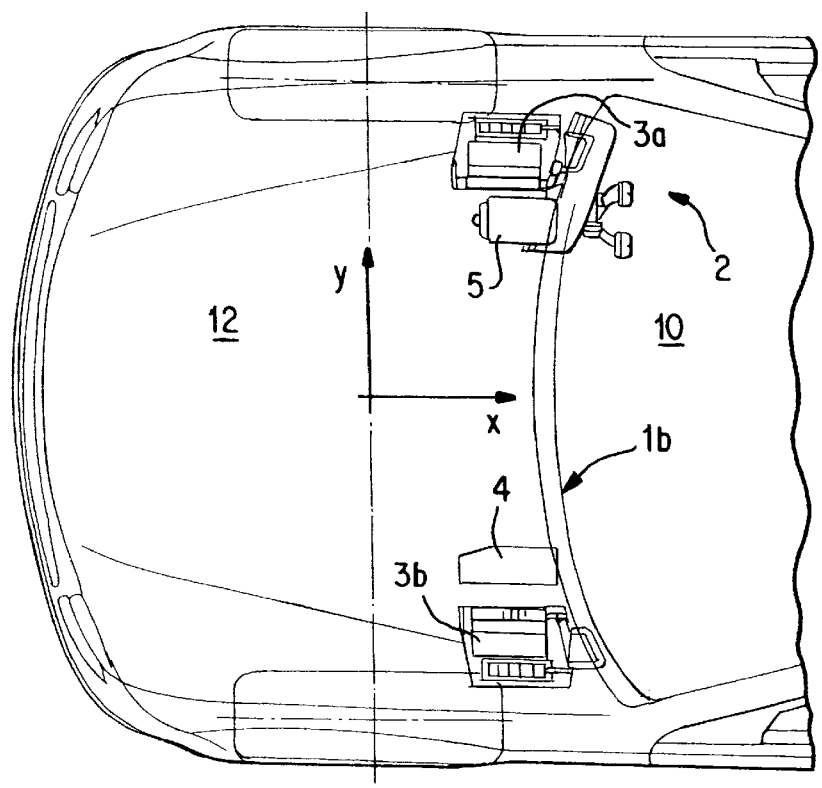
FIG. 4 is a schematic top view of the front portion of an automobile including the firewall of FIG. 3, set up for right-hand drive operation.

In the embodiment according to FIGS. 3–5, in contrast with the embodiment in FIGS. 1–2, an increased number of control devices is provided that can no longer be accommodated in a single control unit box. The control devices are therefore divided between two modules that are defined by a left-hand control unit box 3b and a right-hand control unit box 3a. Both control unit boxes 3a and 3b are positioned at a point outside the middle of the firewall in an installation position relative to the vehicle transverse direction Y such that sufficient distances $a_1$, $a_2$ in the transverse direction of the vehicle remain for braking device 5 and air-conditioning system 4 as provided in each case for right-hand and left-hand drive vehicles. Distance $a_2$ from the respective mounting space of braking device 5 is smaller than distance $a_1$ to the respective mounting space of air-conditioning system 4 on each side.

As can be readily seen from FIGS. 3–5, control unit boxes 3a, 3b retain their mounting positions unchanged on firewall 1b in the transverse direction Y of the vehicle regardless of the design of firewall 1b for left-hand drive (FIG. 3) or right-hand drive (FIG. 4). Thus, for the control devices including the corresponding wiring, it is possible to perform extensive preassembly on firewall 1b or, also according to the embodiment shown in FIGS. 1–2, on firewall 1a, before a decision is made to specify that firewall 1a, 1b will be used for a left-hand or right-hand drive vehicle.

As shown in FIG. 5, which is a view of the firewall 1b of FIGS. 3–4 taken from the engine compartment 12 facing rearwardly, the firewall 1b includes a plurality of mounting spaces. Control unit mounting spaces 23L, 23R are provided for the control unit boxes 3a, 3b on left and right sides of the vertical vehicle center line z, respectively. Air-conditioning system mounting spaces 24L, 24R are provided on left and right sides of the vertical vehicle center line z, respectively. Braking device mounting spaces 25L, 25R are provided on left and right sides of the vertical vehicle center line z, respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A firewall assembly for a motor vehicle, comprising:
   a firewall defining a plurality of mounting spaces;
   at least one module containing electronic control devices mounted in said firewall; and
   at least one functional assembly mounted in either of a first of said mounting spaces located on a left-hand drive side of a center plane of said firewall or a second of said mounting spaces located on a right-hand drive side of the center plane of said firewall,
   wherein the at least one module containing electronic control devices is mounted in said firewall such that an outside contour thereof is located laterally a further distance from said center plane of said firewall than said first and second mounting spaces.

2. A firewall according to claim 1, wherein said first and second mounting spaces are located an identical distance from the center plane of the firewall.

3. A firewall according to claim 1, wherein said at least one module consists of two modules containing electronic control devices, said two modules being located on opposite sides of said center plane of said firewall, the two modules being located an identical distance from said first and second mounting spaces, respectively.

4. A firewall according to claim 2, wherein said at least one module consists of two modules containing electronic control devices, said two modules being located on opposite sides of said center plane of said firewall, the two modules being located an identical distance from said first and second mounting spaces, respectively.

5. A firewall assembly for a motor vehicle, comprising:

a firewall defining a plurality of mounting spaces including a first functional assembly mounting space located on a left-hand drive side of a center plane of the firewall, a second functional assembly mounting space located on a right-hand drive side of the center plane of the firewall, and an electronic control unit mounting space located laterally a further distance from said center plane of said firewall than said first and second mounting spaces;

at least one module containing electronic control devices mountable in said electronic control unit mounting space; and at least one functional assembly mountable in either of said first or second functional assembly mounting spaces.

6. A firewall for a motor vehicle, said firewall defining a plurality of mounting spaces including:

a first functional assembly mounting space located on a left-hand drive side of a center plane of the firewall;

a second functional assembly mounting space located on a right-hand drive side of the center plane of the firewall; and an electronic control unit mounting space located laterally a further distance from said center plane of said firewall than said first and second mounting spaces.

7. A method of assembling a firewall for a motor vehicle, comprising:

providing a firewall defining a plurality of mounting spaces including a first functional assembly mounting space located on a left-hand drive side of a center plane of the firewall, a second functional assembly mounting space located on a right-hand drive side of the center plane of the firewall, and an electronic control unit mounting space located laterally a further distance from said center plane of said firewall than said first and second mounting spaces;

mounting at least one module containing electronic control devices in said electronic control unit mounting space; and mounting at least one functional assembly in either of said first or second functional assembly mounting spaces.

* * * * *